| United States Patent [19] | [11] 4,092,455 |
|---|---|
| Pinto et al. | [45] May 30, 1978 |

[54] USE OF METHYLENEBIS- AND THIOBISNAPHTHOLS AS PROMOTERS IN TIRE CORD ADHESION TO RUBBER

[75] Inventors: Frank George Pinto, Martinsville; Earl Kaplan, Metuchen, both of N.J.

[73] Assignee: American Cyanamid Company, Stamford, Conn.

[21] Appl. No.: 664,468

[22] Filed: Mar. 8, 1976

[51] Int. Cl.$^2$ .................. C08K 3/04; C08K 3/36; C08K 5/34

[52] U.S. Cl. ................. 428/295; 260/42.32; 260/42.33; 260/42.34; 260/42.37; 260/42.43; 260/42.47; 260/609 F; 568/704; 260/762; 526/295; 526/335; 526/338; 526/339

[58] Field of Search .......... 260/42.32, 42.33, 42.34, 260/42.37, 42.43, 42.47, 762, 609 F, 619 A; 428/295; 526/295, 335, 338, 339

[56] References Cited

U.S. PATENT DOCUMENTS 3,212,955  10/1965  Kaizerman .................. 260/887
3,361,617  1/1968   Kaizerman .................. 260/852

FOREIGN PATENT DOCUMENTS 2,448,415  4/1975  Germany.

OTHER PUBLICATIONS

The Merck Index (9th ed.) (Merck & Co.) (Rahway, N.J.) (1976), p. 7940.

*Primary Examiner*—Melvyn I. Marquis
*Assistant Examiner*—H. H. Fletcher
*Attorney, Agent, or Firm*—Frank M. Van Riet

[57] ABSTRACT

Vulcanizable rubber compositions providing excellent bonding of textile or metal reinforcing fibers thereto which comprises a rubber, a filler material, an N-(substituted oxymethyl)melamine and a compound selected from 1,1'-methylenebis(2-naphthol), 2,2'-methylenebis(1-naphthol), mixtures thereof, 1,1'-thiobis(2-naphthol), 2,2-thiobis(1-naphthol), 4,4'-methylenebis(1-naphthol), 4,4'-thiobis(1-naphthol) and mixtures thereof.

14 Claims, No Drawings

USE OF METHYLENEBIS- AND THIOBISNAPHTHOLS AS PROMOTERS IN TIRE CORD ADHESION TO RUBBER

Generally stated the subject matter of the present invention relates to a vulcanizable rubber composition which forms a strong adhesive bond with a tire cord material.

BACKGROUND OF THE INVENTION

May rubber articles, principally automobile tires, but also including hoses, conveyor belts, transmission belts and the like are usually reinforced with textile fibers in cord form, or increasingly, with steel wire. In all such instances the reinforcing material must be firmly bonded to the rubber. This is so whether the fiber is natural, synthetic or metallic, or whether the rubber is natural or synthetic.

The conventional practice has been to prepare the tire cord by pre-treatment with a rubber latex containing a phenol-formaldehyde condensation product, wherein the phenol has almost always been resorcinol. Kaizerman, however, has disclosed the utility of N-(substituted oxymethyl)melamine compounds in place of the conventional resorcinol-formaldehyde in a latex dipping composition; see, for example, U.S. Pat. Nos. 3,212,955 and 3,361,617. In the case of polyester tire cord, such treatment is ordinarily preceeded by treatment of the tire cord with an isocyanate. By a mechanism not completely understood, the resin reacts with the fiber and rubber, effecting a firm reinforcing bond.

An alternative method entails compounding a vulcanizable rubber stock composition with the components of the phenol-formaldehyde condensation product. The components of the condensation product consist of a formaldehyde, or methylene, acceptor and a formaldehyde, or methylene, donor. The most commonly employed methylene acceptor is resorcinol; commonly employed methylene donors are the N-(substituted oxymethyl)melamines. The effect achieved is resin formation in situ during vulcanization of the rubber, creating a bond between the fiber and rubber irrespective of whether the fiber has been pretreated. This method is particularly useful with steel cord, where pretreatment has been largely ineffective.

The use of resorcinol has inherent disadvantages. One of the most frequently encountered is occasioned by the fact that resorcinol is not readily dispersed in rubber. In addition, resorcinol is toxic. The most commonly encountered side effect of its use is a dermatological reaction commonly referred to in the trade as "red hand". These difficulties are further compounded by the fact that there is a worldwide shortage of resorcinol.

In addition, there is an increased need in the industry for fiber reinforcing of rubber to survive high dynamic stress, such as flexing, which has brought about a continuing search for other and better methods for achieving high adhesive strength. Therefore, the present invention is based on an investigation to find a vulcanizable rubber stock composition comprising the components of a phenol-formaldehyde condensation product which avoids the use of resorcinol as the methylene acceptor, as well as providing equal or better bonding results.

THE INVENTION

We have now discovered useful vulcanizable rubber compositions providing excellent bonding of textile or metal reinforcing fibers thereto which comprises a rubber, a filler material, an N-(substituted oxymethyl)melamine and a compound selected from 1,1'-methylenebis(2-naphthol), 2,2'-methylenebis(1-naphthol), mixtures thereof, 1,1'-thiobis(2-naphthol), 2,2'-thiobis(1-naphthol) and mixtures thereof 4,4'-methylenebis (1-naphthol) and 4,4'-thiobis (1-naphthol).

The bisnaphthol compounds useful in the present invention are known. It is preferable to use the methylenebis(2-naphthol) and thiobis(2-naphthol) compounds since beta naphthol is more readily available than alpha naphthol; however, as indicated, either of the alpha naphthol derivatives or mixtures thereof with their beta naphthol analogs, are useful as methylene, or formaldehyde acceptors in the tire cord adhesion system described herein.

The N-(substituted oxymethyl)melamines which serve as the methylene donors when combined with the bisnaphthol compounds have the following general formula:

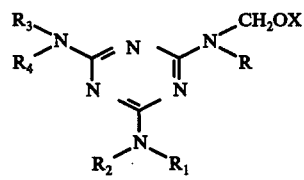

wherein X is hydrogen or lower alkyl (1–8 carbons); R, $R_1$, $R_2$, $R_3$ and $R_4$ are individually hydrogen, lower alkyl having from 1 to 8 carbon atoms or the group —CH$_2$OX, wherein X is as defined above. Specific illustrative species include hexakis(methoxymethyl)melamine, N,N',N''-trimethyl N,N',N''-trimethylolmelamine, hexamethylolmelamine, N,N',N''-trimethylolmelamine, N-methylolmelamine, N,N'-dimethylolmelamine, N,N',N''-tris(methoxymethyl)melamine, and N,N',N''-tributyl-N,N',N''-trimethylolmelamine. A preferred methylene donor is hexakis(methoxymethyl)melamine.

The N-methylol derivatives of melamine are prepared by known methods by reacting melamine with 1 to 6 molar equivalents of formaldehyde. Although N-(substituted oxymethyl)melamines are the preferred methylene donors, others such as hexamethylenetetramine, N-(substituted oxymethyl)ureas, N-(substituted oxymethyl)imidazolidines, N-(substituted oxymethyl)hydantoins may also be useful.

Any textile material normally used to reinforce rubber may be used with the vulcanizable compositions of this invention, including cotton, rayon, polyamides, and polyester fibers. A particularly useful reinforcing material found to form strong adhesive bonds to rubber in accordance with the invention is steel or brass-plated steel wire.

The rubber being bonded to the reinforcing material may be any rubber used in the manufacture of automobile tires, drive belts, conveyor belts or pressure hose. These include natural rubber; synthetic diene rubbers, such as polybutadiene or polyisoprene; ethylene-propylene terpolymer rubbers (EPDM); butadiene, styrene copolymer rubbers (SBR); butadiene acrylonitrile copolymer rubbers (NBR); chloroprene rubber, or chlorosulfonated polyethylene, or mixtures thereof.

The rubber vulcanizate which is bonded to the textile fiber or steel wire by in situ resin formation will contain conventional compounding ingredients such as carbon black, antioxidants, sulfur, zinc oxide, accelerators, high surface area activated silica (including mixtures thereof with carbon black), processing and softening oils, and the like.

The N-(substituted oxymethyl)melamines are incorporated into the rubber vulcanizate in an amount of from about 1 to 10 parts per hundred parts of rubber, preferably about 2 to 4 parts per hundred parts of rubber.

The methylenebisnaphthol or thiobis naphthol compounds are incorporated into the rubber vulcanizate in an amount of from about 0.5 to 8 parts per hundred of rubber, preferably 1 to 3 parts per hundred of rubber.

For optimum adhesion of the reinforcing cord material, whether textile fiber or steel, to rubber it has been found desirable to incorporate a high surface area activated silica into the vulcanizate composition. When used the silica is added in an amount of from about 2 to 14 parts per hundred of rubber, preferably about 8 to 12 parts per hundred of rubber.

A preferred method of making the rubber vulcanizate is to mix the rubber, carbon black, zinc oxide, lubricants, the bisnaphthol compound, and the like, in a Banbury mixer at a temperature of about 300° F. The resulting masterbatch is then compounded on a standard 2-roll rubber mill with sulfur, accelerators, silica, and the N-(substituted oxymethyl) -melamine compound. The vulcanizable composition is shaped, placed in contact with the reinforcing material, i.e. textile fiber or steel wire, and vulcanized.

Alternatively, improved adhesion of the reinforcing material, for example a textile fiber tire cord, may be achieved by a modification of the well known dipping technique or "RFL" technique, whereby a rubber latex, such as a butadiene-styrene rubber latex (SBR) or a butadiene-vinylpyridine latex, or mixtures thereof, containing the bisnaphthol compound and the N-(substituted oxymethyl) melamine, is used to coat the cord by dipping and the dipped cords placed in contact with the rubber composition and vulcanized.

Adhesion was measured in the examples herein using ASTM D-2229 modified by pulling 7 alternating wires while holding the sample by two adjacent wires protruding from the opposite side of the sample, thereby reducing the effect of the rubber modulus on the adhesion values.

The following examples are provided for illustrative purposes and may include particular features of the invention. However, the examples should not be construed as limiting the invention, many variations of which are possible without departing from the spirit or scope thereof.

EXAMPLE

Masterbatches containing 100 parts by weight of rubber were prepared as follows:

| Masterbatch Compositions | A | B | C | D |
|---|---|---|---|---|
| Natural rubber (SMR-5L) | 52 | 52 | 52 | 52 |
| Polybutadiene | 18 | 18 | 18 | 18 |
| SBR 1500 | 30 | 30 | 30 | 30 |
| Carbon black | 40 | 40 | 40 | 40 |
| Zinc oxide | 5 | 5 | 5 | 5 |
| Stearic acid | 2 | 2 | 2 | 2 |
| Cyanflex$^R$ 50 (a) | 2 | 2 | 2 | 2 |

-continued

| Masterbatch Compositions | A | B | C | D |
|---|---|---|---|---|
| Resorcinol | 2 | — | — | — |
| 1,1'-methylenebis(2-naphthol) | — | 2 | — | — |
| 1,1'-thiobis(2-naphthol) | — | — | 2 | — |
|  | 151 | 151 | 151 | 149 |

(a) Reaction product of diphenylamine and acetone; 50 percent by weight on carbon black.

The above masterbatches were then compounded on a standard rubber mill at 50° C, for 5 minutes as follows:

| Prevulcanizate Compositions | A | B | C | D |
|---|---|---|---|---|
| Masterbatch | 151 | 151 | 151 | 149 |
| Sulfur | 2.4 | 2.4 | 2.4 | 2.4 |
| N-oxydiethylene benzothiazole -2-sulfenamide | 1.3 | 1.3 | 1.3 | 1.3 |
| Activated Silica (Hi-Sil EP) | 10.0 | 10.0 | 10.0 | — |
| Hexakis(methoxymethyl)melamine | 3.0 | 3.0 | 3.0 | — |

The compositions were embedded with 15 clean, brass-plated steel wires, placed parallel, and the compositions vulcanized for 24 minutes at 307° F.

Adhesion, as measured in accordance with the aforementioned ASTM method (modified) gave the following results (adhesion, pounds per linear inch, pli).

| Adhesion Evaluation (Avg. of seven specimens) | | | | |
|---|---|---|---|---|
|  | A | B | C | D (b) |
| Adhesion, pli | 218 | 214 | 196 | 102 |

(b) The average value for adhesion, pli, in a composition containing no methylene donor or acceptor or silica. The composition is included as a control.

The above data illustrate that 1,1'-methylene bis (2-naphthol) and 1,1'-thiobis(2-naphthol) provide adhesion of steel wire to rubber as effectively as the commonly used compound resorcinol.

We claim:

1. In a vulcanizable rubber composition comprising rubber, a filler material and an N-(substituted oxymethyl) melamine having the general formula:

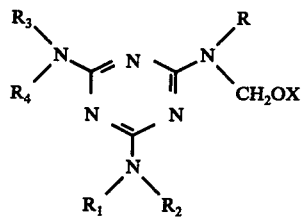

wherein X is hydrogen or lower ($C_1$–$C_8$) alkyl; R, $R_1$, $R_2$, $R_3$ and $R_4$ are individually hydrogen, lower ($C_1$–$C_8$) alkyl or the group — $CH_2OX$, X being as defined hereinabove, the improvement which comprises: incorporating into said rubber composition an effective adhesion promoting amount of a compound selected from (a) 1,1'-methylenebis(2-naphthol), (b) 2,2'-methylenebis (1-naphthol), (c) mixtures of (a) and (b), (d) 1,1'-thiobis(2-naphthol), (e) 2,2'-thiobis(1-naphthol), (f) mixtures of (d) and (e), (g) 4,4'-methylenebis(1-naphthol) and (h) 4,4'-thiobis(1-naphthol).

2. The composition of claim 1 wherein the N-(substituted oxymethyl) melamine is hexakis(methoxymethyl)melamine.

3. The composition of claim 1 wherein the N-(substituted oxymethyl) melamine is present in a concentration of from about 1 to 10 parts per hundred parts of the rubber therein.

4. The composition of claim 2 wherein the concentration of hexakis (methoxymethyl)melamine is 2 to 4 parts per hundred of rubber.

5. The composition of claim 1 wherein the adhesion promoting compound is 1,1'-methylenebis(2-naphthol).

6. The composition claim 1 wherein the adhesion promoting compound is 1,1'-thiobis(2-naphthol).

7. The composition of claim 5 wherein the concentration of 1,1'-methylenebis(2-naphthol) is from about 0.5 to 8 parts per hundred of rubber.

8. The composition of claim 6 wherein the concentration of 1,1'-thiobis(2-naphthol) is from about 0.5 to 8 parts per hundred of rubber.

9. The composition of claim 7 wherein the concentration is 1 to 3 parts per hundred of rubber.

10. The composition of claim 8 wherein the concentration is 1 to 3 parts per hundred of rubber.

11. The composition according to claim 1 wherein the rubber is selected from the group consisting of natural rubber, polybutadiene, polyisoprene, polychloroprene, butadiene/styrene copolymer rubbers, butadiene/acrylonitrile copolymer rubbers, ethylene-propylene diene modified terpolymer rubbers and blends thereof.

12. A vulcanized rubber article reinforced with a textile fiber or wire cord prepared from the vulcanizable rubber composition of claim 1.

13. The composition according to claim 1 comprising 2 to 14 parts of high surface area activated silica per hundred parts of the rubber.

14. The composition according to claim 1, comprising carbon black.

* * * * *